(No Model.)
H. C. PRIEBE.
CLOTHES LINE REEL.
No. 402,477. Patented Apr. 30, 1889.
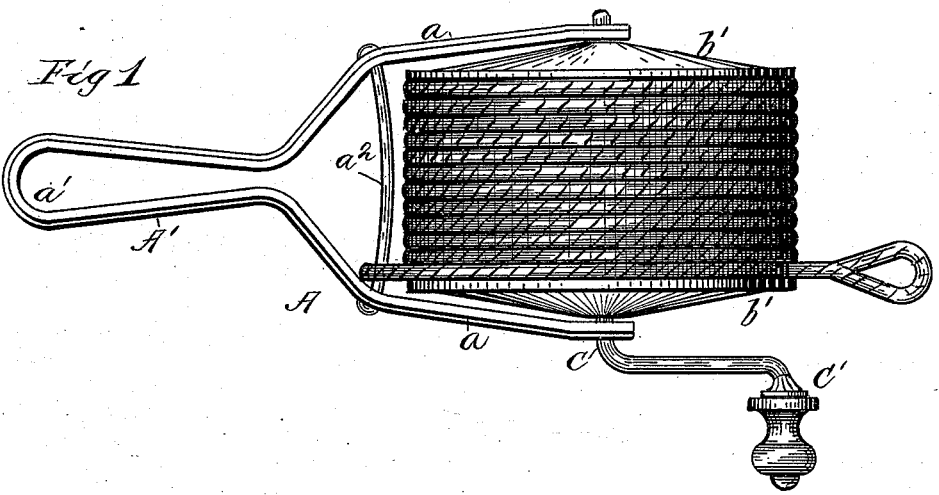
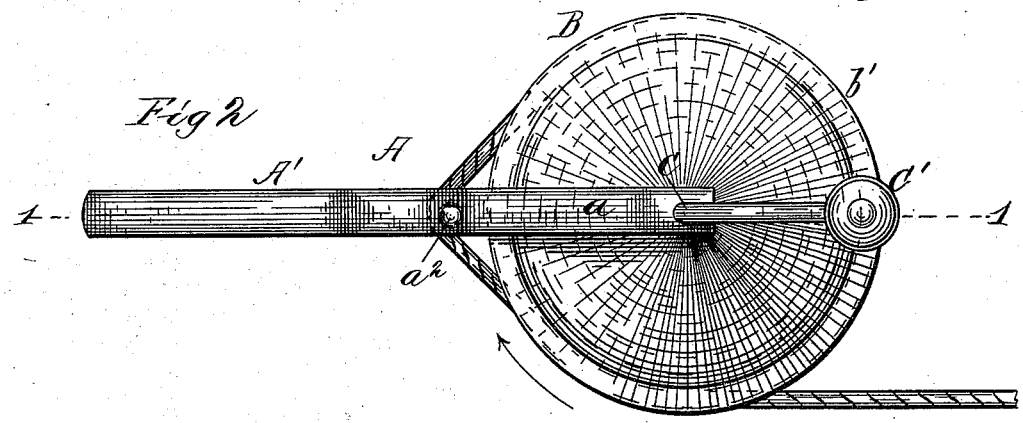
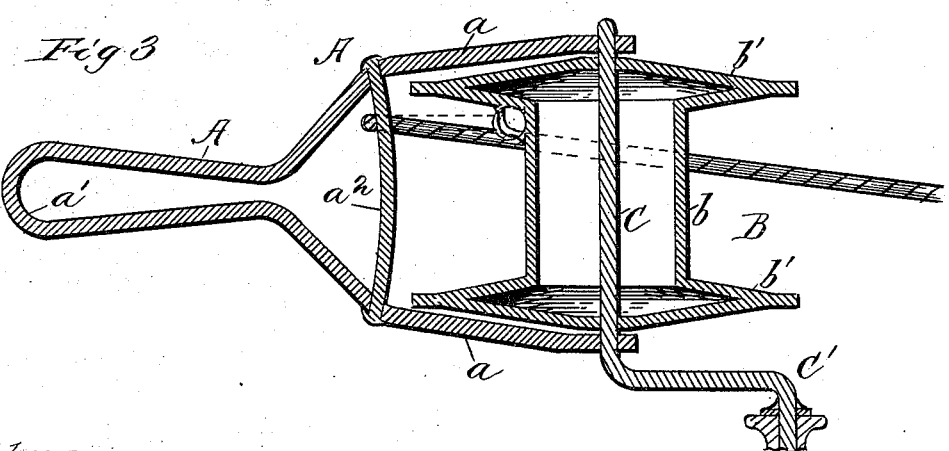
Witnesses,
W. C. Coolies
A. M. Best.
Inventor
Herman C. Priebe
By Coburn V Thacher
Att'ys

UNITED STATES PATENT OFFICE.

HERMAN C. PRIEBE, OF ENGLEWOOD, ILLINOIS.

CLOTHES-LINE REEL.

SPECIFICATION forming part of Letters Patent No. 402,477, dated April 30, 1889.

Application filed December 13, 1888. Serial No. 293,510. (No model.)

*To all whom it may concern:*

Be it known that I, HERMAN C. PRIEBE, a citizen of the United States, residing at Englewood, in the county of Cook and State of Illinois, have invented a certain new and useful Improvement in Clothes-Line Reels, which is fully set forth in the following specification, reference being had to the accompanying drawings, in which—

Figure 1 is a plan view of a clothes-line reel embodying my invention; Fig. 2, a side elevation of the same, and Fig. 3 a sectional view taken on the line 1 1 of Fig. 2.

Like letters refer to like parts in all the figures of the drawings.

My invention relates to clothes-line reels, and has for its object to provide a light and portable reel upon which the clothes-line may be wound when not in use, to prevent its becoming tangled or damaged, and by means of which it may be carried from place to place or hung up, as desired.

To these ends my invention consists in certain novel features, which I will now proceed to describe, and will then particularly point out in the claim.

In the drawings, A represents the frame in which the reel is mounted. This frame consists of two lateral arms, $a$, preferably formed in a single piece, as shown, and contracted at their united ends, as shown at A', to form a handle, by means of which the frame may be grasped and held. The space $a'$, inclosed by the handle portion of the frame, forms a means by which the entire device may be hung up or supported when desired. The arms $a$ are connected by a rod, $a^2$, at a point a short distance in the rear of the reel, which rod serves not only as a strengthening device for the arms, but also as a guide for the line during the operation of reeling and unreeling, as hereinafter described.

B represents the reel proper, which consists of a cylindrical body, $b$, and end pieces, $b'$, the whole being mounted upon the shaft or axis C, which revolves in suitable bearings in the ends of the arms $a$ of the frame A. One end of the shaft C is formed into a crank-handle, C', by means of which the reel may be rotated.

The device thus constructed operates in the following manner: The line, when not in use, may be wound upon the reel in the manner shown in Figs. 1 and 2, and the reel may be carried about by the handle or hung up in any suitable place of storage. When it is desired to use the line, the reel is taken down and carried to the desired point, when the line may be readily unreeled and stretched. Both in reeling and unreeling the line passes over the rod $a^2$, and this facilitates these operations by enabling the line to be smoothly reeled while winding it up.

The device is light and portable, and may be carried from place to place and hung up, as desired, and it effectually prevents tangling of the line or damage to the same when left exposed.

Having thus described my invention, what I claim as new, and desire to secure by Letters Patent, is—

In a clothes-line reel, the combination, with the frame A, consisting of arms $a$, handle A', with space $a'$ and rod $a^2$, of the reel B and the shaft C, mounted in the arms $a$ and provided with crank-handle C', substantially as and for the purposes specified.

HERMAN C. PRIEBE.

Witnesses:
   IRVINE MILLER,
   CARRIE FEIGEL.